Oct. 31, 1939.    J. C. HODGE    2,177,927
WELDED METALLIC BODY AND METHOD OF MAKING SAME
Filed July 29, 1936
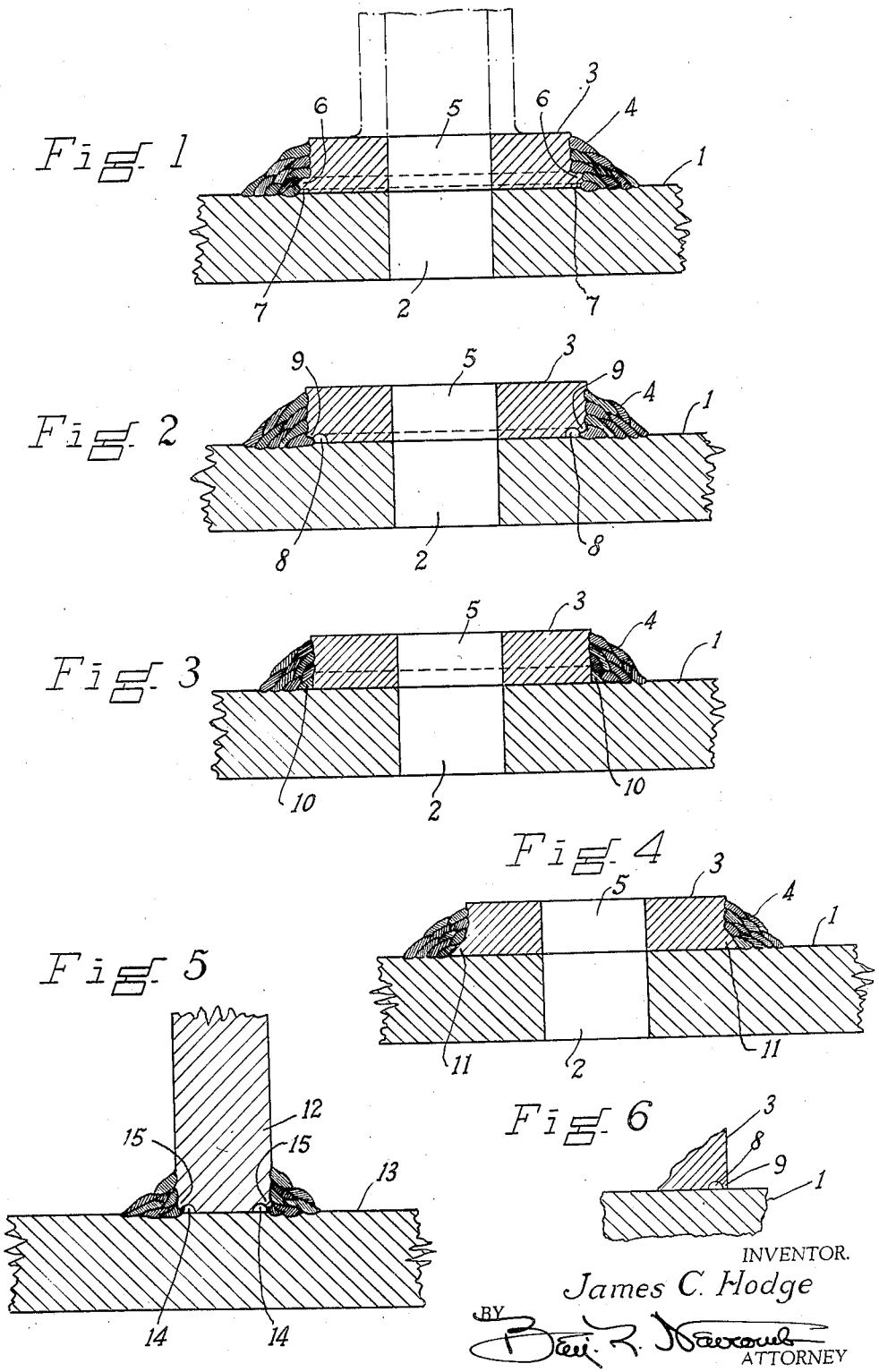
INVENTOR.
James C. Hodge
ATTORNEY Patented Oct. 31, 1939

2,177,927

UNITED STATES PATENT OFFICE 2,177,927

WELDED METALLIC BODY AND METHOD OF MAKING SAME

James C. Hodge, Barberton, Ohio, assignor to The Babcock & Wilcox Company, Newark, N. J., a corporation of New Jersey Application July 29, 1936, Serial No. 93,132

6 Claims. (Cl. 113—112)

My invention deals with the formation of a welded connection between metallic bodies and particularly between bodies of considerable cross section and rigidity.

In the attachment, for example, of a heavy reinforcing pad or flange around a nozzle opening in a thick walled vessel the parts being joined may be of sufficient rigidity to resist the contraction of the deposited weld metal with the consequence that cracks may be formed in the fused metal upon cooling and result in a defective connection. The tendency for the formation of cracks in the deposited metal is particularly evident when the surfaces of the companionate bodies meet at a sharp corner or recess within which the weld metal is deposited. The main difficulty lies in securing sound, crack-free deposits at the bottom of the recess, but when this is accomplished, succeeding beads, or layers can be deposited without the development of cracks in the final fillet weld.

Therefore, an object of my invention is a method of producing a welded connection between metallic bodies which obviates the formation of cracks, in the weld metal, incident to cooling.

A further object is to alleviate the extreme notch effect at the juncture of the bodies by eliminating the abrupt corner at the base of the recess and compensating for the normal contraction of the fused metal in a manner avoiding excessive residual strains or cracks in the completed weld.

An additional object is to provide, at the juncture of the bodies, a stress relieving formation which may conveniently be a filler piece formed integrally with one of the bodies, or as an initially separate member, either form being of a more flexible character than the main bodies. In laying the first beads or layers, these are fused into the filler piece and as the weld metal cools the stresses are more widely distributed and there is less resistance offered to contraction of the metal than if the beads are fused directly into the more rigid walls of the main bodies.

Further objects and advantages of my invention will be apparent from the specification appearing below, particularly when considered in conjunction with the illustrations of specific embodiments which are included in the accompanying drawing as follows:

Figs. 1 to 4, inclusive, are similar sectional views transversely of the weld deposited metal and illustrating various forms of welded connections produced in accordance with my invention.

Fig. 5, a similar sectional view of an additional embodiment constituting a T-form of connection between two plate members, and Fig. 6 is a fragmentary view showing the detail formation of the parts in Fig. 2 prior to welding.

In detail:

In Figs. 1 to 4, inclusive, 1 represents a relatively thick plate or wall of a hollow vessel; 2 an opening in said wall; and 3 a reenforcing pad or flange which is secured to the vessel wall by a fillet weld 4. The dot-and-dash lines in Fig. 1 indicate a nozzle body or similar member of which the pad or flange 3 may form a part, the same construction being also applicable to Figs. 2, 3, and 4. An opening 5 in the pad 3 is shown in alignment with opening 2 in the vessel wall, either or both openings being formed, as most convenient, before or after the companionate plate members are welded together. Assuming, for example, that 3 represents the reenforcing flange of a connection nozzle, the holes would ordinarily be formed in both parts before the welding operation, but if the plate 3 is intended as a reenforcing pad for building up a suitable wall thickness at the connection opening, the aligned holes might be drilled through both plates in one operation after the pad is welded in position. These alternate details of construction are cited merely to indicate the scope of my invention and will be readily understood without further discussion or illustration.

In Fig. 1, pad 3 is formed with an annular lip 6 spaced from the bottom edge of the flange so that when the pad is in position and contacting with the wall 1 of the vessel, a space 7 is left between the lip and the wall. The weld metal 4 is fused into the recess formed by the walls of the pad and vessel, overlying the projecting lip 6 which serves as a filler at the bottom of the recess. The initially deposited beads fuse into the lip 6, which by reason of its flexibility affords a yielding formation at the apex of the recess to compensate for the contractional stress in the weld metal as it cools.

Fig. 2 shows a pad 3 provided with an annular groove 8 in its lower surface and closely adjacent the outer edge to provide a relatively thin flexible lip 9 at the bottom of the welding notch or recess. The weld metal is fused into the lip and forms a filler at the apex of the recess which will reduce the notch effect and permit cooling of the weld metal without the formation of cracks.

Fig. 3 illustrates the means whereby the sharp corner at the juncture of the bodies is eliminated by the use of an initially separate member 10 which fits into the apex of the welded recess.

The member may be formed as a continuous ring, or in segments, and provides a stress-relieving formation which promotes the deposit of the initially deposited beads without cracking and of subsequent beads or layers to complete the fillet weld. The ring 10, which in this embodiment is shown triangular in cross section, is of a more flexible character than the main portions of the bodies being joined, thus compensating for tensile stresses in the deposited metal as it cools.

In Fig. 4, filler 11 is provided at the base of the notch and although similar in cross section to filler 10 in Fig. 3, is formed as an annular projecting lip at the bottom of plate 3, tapering in cross section to a thin edge adjacent the shell 1.

Fig. 5 shows the application of my invention to a T-connection between thick plates where an edge of one plate 12 abuts the other plate 13. Grooves 14 in the abutting edge of plate 12 provide relatively thin lips 15 at the corners formed between the two plates, corresponding to the formation of similar parts in Fig. 2. When weld metal is deposited in the corners, fusion takes place into the flexible lips and the fused metal will fill the apex of the recess, thus presenting a less accentuated notch condition, and by reason of the relatively flexible character of the lips, compensating for the contraction of the metal to form a sound, crack-free fillet weld.

In the practice of my invention, it will be found that its principles may be applied to a wide variety of uses, and with such applications in mind, I have set forth my invention in the following claims whose scope is limited only by the prior art.

I claim:

1. The method of joining thick metallic plates which comprises establishing contact between weld-conforming surfaces thereof and forming a welding recess between relatively transverse adjoining surfaces, forming a groove in the contacting surface of one of said plates and providing said groove with a thin outer wall adjoining said recess, and depositing fusing welding metal within said recess to fuse with said wall and the other of said plates.

2. The method of joining thick metallic plates which comprises establishing contact between weld-conforming surfaces thereof and forming a welding recess between relatively transverse adjoining surfaces, forming a groove in the contacting surface of one of said plates and providing said groove with a thin outer wall adjoining said recess, and depositing fusing welding metal within said recess in successive layers to cause initially deposited metal to fuse with said wall and penetrate said groove and to unite with the other of said plates.

3. The method of fillet welding thick metallic plates which consists in positioning said plates relatively to bring a surface of a first plate in contact with a companionate surface of a second plate and to form a welding recess between said second plate and a transversely disposed marginal surface of said first plate, forming a groove in the contacting surface of said first plate so disposed relative to said recess as to provide a thin outer wall for said groove initially separating said groove from said recess, and depositing fusing welding metal in successive layers within said recess to cause initially deposited metal to fuse with said wall and said second plate.

4. As an article of manufacture, a tubular body having a base flange of substantial thickness adapted to be placed in contact with a correspondingly thick wall of a pressure vessel and peripherally welded thereto, and means forming an annular groove in the under surface of said flange to provide a thin outer wall for said groove terminating substantially in the plane of the under surface of the flange and constituting a flexible lip at the periphery of said flange adapted to adjust itself to relieve stress in welding metal peripherally applied between said flange and wall.

5. The method of fillet welding thick metallic plates which consists in positioning said plates relatively to bring a surface of a first plate in contact with a companionate surface of a second plate, the arrangement being such that the adjoining surface portion of the second plate constitutes an extension of the contacting surface portion of said plate and forms with the transversely related marginal portion of the first plate a recess for the reception of welding metal, forming the marginal portion of said first plate to include a relatively flexible marginal lip adjacent said recess of substantially smaller thickness throughout than the thickness of said plate and having its free end so disposed relative to the plane of the aforesaid contacting surfaces as to enable the layer of welding metal initially deposited within said recess to unite with said free end and with said second plate, and depositing fusing welding metal in successive layers within said recess to cover said lip so that the initially deposited metal fuses with the free end of said lip and said second plate.

6. The method of reinforcing a perforated wall which consists in correspondingly perforating a reinforcing plate member, placing said plate and wall in contact along companionate surfaces thereof and in register each with the other with respect to hole location, the arrangement being such that the adjoining surface portion of the wall constitutes an extension of its contacting surface portion and forms with the transversely related marginal portion of the reinforcing member a recess surrounding said member for the reception of welding metal, forming the marginal portion of said reinforcing member to include a relatively flexible peripheral lip adjacent said recess of substantially smaller thickness throughout than the thickness of said member and having its free end so disposed relative to the plane of the aforesaid contacting surfaces as to enable the layer of welding metal initially deposited within said recess to unite with said free end and with said wall, and depositing fusing welding metal in successive layers within said recess to cover said lip so that the initially deposited metal fuses with the free end of said lip and said wall.

JAMES C. HODGE.